Patented July 26, 1938

2,124,865

UNITED STATES PATENT OFFICE 2,124,865

PATCHING INTERIOR SURFACES OF FURNACES

Frederick W. Winkler, Francis X. Mooney, and Charles R. Kuzell, Clarkdale, and Melvin T. Mounts, Cottonwood, Ariz., assignors to Phelps Dodge Corporation, New York, N. Y., a corporation of New York No Drawing. Application October 8, 1937, Serial No. 167,978

13 Claims. (Cl. 266—43)

This invention relates to the patching of interior surfaces of continuously operated furnaces, without interrupting or unduly disturbing the operations thereof. More particularly, this invention includes a practical method for building up a patch of refractory material upon a flame-exposed surface of a high temperature continuously operated furnace, such as the side walls or roof of a metallurgical or glass furnace, without interrupting the operation of the furnace or superheating the surface to be patched.

It has heretofore been proposed to patch interior surfaces of such a furnace during a period when the furnace is shut down and while the surface to be patched is relatively cool compared with the normal operating temperatures of the furnace. Patching under such conditions does not involve exceptional problems, but shutting down the furnace for repairs or patching greatly increases the maintenance and operating costs thereof. It has also been proposed to patch the interior surface of a furnace while in a heated state by applying a flame to the surface to be patched to superheat and soften the surface, and then blowing a granular refractory material against the softened surface in such a manner that the added refractory becomes embedded in the softened surface being treated. Such a procedure involves the expense and inconvenience of superheating the surface to be patched and requires the use of complicated apparatus to carry out the method while the furnace is being operated. This is especially true where the surface to be patched is not readily accessible from the outside of the furnace and a long operating nozzle is required.

It is an object of this invention to provide a method for patching an interior surface of a high temperature furnace during operation of the furnace and without superheating the surface to be patched.

It is also an object of this invention to build up a patch on a flame-exposed surface of a furnace, without interrupting the operation thereof, by spraying successive thin coats of pulverized refractory material on the surface to be patched in such a manner that the patch becomes thermally bonded and adhesively secured to the treated surface.

A further object of this invention is the provision of a patching method utilizing a slurry of refractory material having a particle size suitable for obtaining good adhesion when applied to the surface and having a chemical composition so proportioned as to form a durable integral patch.

We have discovered that a flame-exposed surface, such as the arch, side wall, or uptake of a reverberatory furnace can be successfully patched, without interrupting the operation of the furnace, by applying to such surface successive thin coats of a pulverized refractory material suspended in water in the form of a slurry. To obtain the best results, it is important that the particle size and chemical composition of the refractory material, and the plasticity of the slurry be properly regulated to effect good adhesion of the deposit when initially applied, and to effect hot bonding of the material after exposure to the heat of the furnace. The exact proportions of particle size and chemical composition will vary somewhat depending on the temperature of the surface to which the material is applied, the highest temperature to which this material is exposed under operating conditions, the durability required of the patch, and the location and position of the surface to be patched. For example, if a patch is to be applied to the underside of a furnace arch, better results will be obtained in general, by the use of a thinner slurry containing more water, whereas a thicker slurry containing less water is preferable for application to a side wall of a furnace.

We have discovered that the best results are obtained for high temperature metallurgical furnaces constructed of silica by using a refractory material composed of a sandstone or commercial silica high in $SiO_2$, together with a small amount of a fire-clay up to about 10%. These refractory materials, preferably both pulverized to a particle size such that a major portion thereof will pass through a 200 mesh screen, should be mixed before application with a suitable quantity of water to obtain the desired plasticity. The actual quantities of water employed may be varied with the chemical composition of the refractory materials, although it is preferred that the resultant slurry have a specific gravity of approximately 1.5 to 1.9. Such a slurry is easily sprayed, using pneumatic pressure, and is easily transported through a simple delivery pipe to the place of application.

One very satisfactory way of making the slurry is to mix the fire-clay with a smaller amount of water than will be required ultimately and to subject this mixture to heat and agitation for a sufficient time to obtain a homogeneous suspension of the fire-clay. This clay suspension may then be thoroughly mixed with additional water and pulverized silica to provide a uniform aqueous suspension or slurry of refractory material ready for application. The proportion of fire-clay to silica is preferably maintained within the limits of about 0.1 to about 10% fire-clay with the balance silica, on a dry basis, in order to obtain the most durable patch, although the fire-clay may be omitted. With 100 parts of dry refractory materials, a total of 25 to 70 parts, by weight, of water may be employed, depending upon the location of the surface to be patched.

Another method of preparing the slurry, and one which may be preferable from the standpoint of time consumed, is simply to mix water with the dry refractory materials in an agitating mixer such as a small cement mixer. This method may also result in a little more accurate proportioning of the solids when the slurry is prepared on a commercial scale.

The method of this invention also may be applied to the patching of furnaces constructed of refractory materials other than silica, for example magnesite, periclase, or chrome refractories. Where the invention is applied to the patching of furnaces, such as basic lined converters, constructed of these other refractories, the chemical composition of the solids in the slurry should be appropriately varied to obtain the desired adhesion and thermal bonding of the patch.

The slurry may be applied through an available opening in the furnace to the surface to be patched, or a special opening in the furnace wall may be made for this purpose. An opening 24 inches long by 12 inches in height is usually adequate. The patching of the furnace is preferably carried out while the furnace is being operated at a normal rate, although if desired, the firing of the furnace may be somewhat reduced or even entirely discontinued for a short time during the patching operation. Any suitable apparatus for supplying a stream of the slurry mixed with a gas such as air or steam under pressure may be used in conjunction with a spray pipe or nozzle. Suitable forms of apparatus for this purpose are shown and described in U. S. Patent #1,574,183 to Bodfish and U. S. Patent #1,578,944 to Wilkinson. Various forms of conventional cement guns may also be used to produce a spray of the slurry under pneumatic pressure. The nozzle employed need only be a simple pipe of sufficient length to easily reach the point of application of the refractory material inside the furnace, while the operator holds one end of the nozzle and directs its manipulation from outside of the furnace. This nozzle may be bent at different angles, depending upon the point of application desired, or it may be a straight pipe with a deflecting lip at its end to direct the spray in the desired direction. The particular form of apparatus employed does not form a part of this invention.

The procedure of patching a furnace arch or side wall after the slurry has been mixed and is ready for use is preferably as follows:

The spraying apparatus is charged with a suitable quantity of slurry, sufficient to apply a coating ⅛ to ½ inch thick to the area desired to be patched. Air or steam pressure is then applied to start the flow of slurry through the delivery nozzle. As soon as the flow is well established, the nozzle may be inserted through the opening in the furnace wall and the tip of the nozzle brought into close proximity to the area to be patched. The nozzle is then manipulated back and forth to apply the desired thin coating and as soon as the charge of slurry is exhausted, the nozzle should be quickly withdrawn from the furnace. The air or steam pressure should be maintained to provide a flow through the nozzle until after the nozzle has been withdrawn from the furnace and has cooled. The nozzle employed may be a simple tubular member, such as a pipe, and because of the use of a slurry does not require special cooling means. The apparatus is then recharged and a second coating applied in the same manner over the first coating. In this way, successive coats of the refractory material are applied to the surface to be patched until the desired thickness of the patch is built up. Sufficient time should be allowed to elapse between each coating for the refractory material last applied to set. Usually a time interval of 5 to 10 minutes between coatings is sufficient.

In order that the invention may be more fully understood, a specific example of the preparation and application of the materials used and found suitable for the patching of a reverberatory furnace will be described. A sandstone which has been found to be particularly satisfactory is known as Seligman silica obtained in Arizona and analyzing approximately as follows:

| | Per cent |
|---|---|
| $SiO_2$ | 94–96 |
| FeO | 1.0 |
| $Al_2O_3$ | 2.6 |
| CaO | 0.3 |

This material, after quarrying, is crushed to a granular form and is then further reduced by pulverizing in a suitable mill, such as a Raymond coal pulverizer, equipped with an air separator and dust collector. A size of silica particles which has been found to be satisfactory is as follows:

| | Per cent |
|---|---|
| On 200 mesh | 22–35 |
| On 300 mesh | 25–40 |
| Through 300 mesh | 53–30 |

All of the material remaining on the 200 mesh screen was found to pass through a 100 mesh screen.

A suitable fire-clay for use with the silica analyzed approximately as follows:

| | Per cent |
|---|---|
| $SiO_2$ | 57.2 |
| $Al_2O_3$ | 28.23 |
| $Fe_2O_3$ | 2.42 |
| CaO | 0.12 |
| MgO | 0.91 |
| Ignition loss | 11.77 |

Such a fire-clay is preferably prepared for use by pulverizing in a suitable mill to a size approximately that given above for the silica. This pulverized fire-clay is then mixed with 1.75 lbs. of water for each pound of fire-clay and heated and agitated for several hours to provide a uniform and thorough dispersion of the material, and yield a liquid having a specific gravity of about 1.28.

One suitable way of heating and agitating the water and fire-clay mixture is to subject it to the action of a jet of live steam for several hours. In this case, due allowance should be made for steam condensate when adding the water. This clay suspension is then mixed with powdered silica and additional water in proper proportions to provide a ratio of about 97% Seligman silica with 3% fire-clay, on a dry basis. The mixing of the slurry may be conveniently carried out in any suitable agitating mixer. The amount of water is preferably varied, dependng upon the point of application of the slurry. For patching the underside of a reverberatory arch a thin slurry would be desired, containing for example 97 lbs. Seligman silica, 8.25 lbs. fire-clay suspension, 54.75 lbs. additional water. This would yield a slurry having a specific gravity of approximately 1.6.

It is preferred to spray a thin slurry of this mixture on the underside of a furnace arch under a fairly high pressure, for example, using about 35–60 lbs. pressure. About 2 cubic feet of such a slurry is suitable for applying a single coating to an area of 10 to 12 sq. ft. on the underside of the furnace arch.

For preparing a slurry to use on side walls or uptakes of a reverberatory furnace, a thicker slurry is desired and the amount of additional water employed is preferably about 31.75 lbs., with 97 lbs. Seligman silica and 8.25 lbs. fire-clay suspension, yielding a slurry having a specific gravity of approximately 1.8. A higher pressure such as 50–80 lbs. for spraying this slurry against the side walls or uptakes may also be employed, because of the greater density.

After the patch has been built up to the desired thickness, usually 3 to 6 inches, the side wall opening of the furnace may be closed in any suitable manner.

The slurry, when sprayed as described above on the hot surface to be patched, readily sticks to such surface. After the refractory material has set under the heat of the furnace, the patch becomes thermally bonded. If the material employed is too refractory, such bonding will not take place. On the other hand, the refractory material in the slurry should not be of such a chemical composition that it will become softened appreciably at the temperatures of the furnace.

A patching method in accordance with this invention has proved to be practical and highly efficient in actual practice, making possible the continuous operation of a reverberatory or similar furnace for much longer periods of time than has been possible heretofore. The aparatus required is simple and easy to operate, and it is not necessary either to shut down the furnace for patching or to superheat the surface being treated.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. The method of patching the interior of a high temperature continuously operating furnace comprising preparing a slurry of water and powdered refractory material, said material comprising principally silica and being proportioned chemically to produce an adhesive thermally bonded deposit at the temperatures of operation of said furnace, and pneumatically spraying a thin coating of said slurry upon an interior surface of said furnace while said furnace is being operated.

2. The method of patching the interior of a high temperature continuously operating furnace comprising preparing a slurry of water and powdered refractory material, said material comprising principally silica and being proportioned chemically and of such a particle size as to produce an adhesive deposit thermally bonded by incipient fusion at the operating temperatures of said furnace, and pneumatically spraying a thin coating of said slurry upon an interior surface of said furnace while said surface is at a normal temperature for the operation of said furnace.

3. The method of patching the interior of a high temperature continuously operating metallurgical furnace comprising spraying an aqueous suspension of pulverized refractory material in a thin coating on an interior surface of said furnace while said surface is at a normal temperature for the operation of said furnace, allowing said coating to set, and subsequently spraying a second thin coating of said material over said first coating, said refractory material comprising principally silica together with sufficient oxides of aluminum, iron, and calcium to produce an integral adhesive thermally bonded deposit at the operating temperature of said furnace.

4. The method of patching the interior of a high temperature continuously operating reverberatory furnace comprising spraying an aqueous suspension of pulverized refractory material in a thin coating on an interior surface of said furnace while said surface is at a normal temperature for the operation of said furnace, allowing said coating to set, and subsequently spraying a second thin coating of said material over said first coating, said refractory material comprising principally silica with a small amount of fire-clay so proportioned that said coatings become ceramically bonded by incipient fusion at the highest normal operating temperature of said furnace.

5. The method of patching the interior of a high temperature continuously operating reverberatory furnace comprising preparing a slurry of water and powdered refractory material, said material comprising principally silica with a small amount of fire-clay in such proportions and of such particle size that a coating thereof becomes ceramically bonded by incipient fusion at the highest normal operating temperature of said furnace, pneumatically spraying a thin coating of said slurry upon an interior surface of said furnace without interrupting the operation of said furnace.

6. A method of hot patching a flame-exposed surface of a high temperature continuously operating furnace comprising spraying a slurry of powdered refractory material and water in a thin coating on said surface while said furnace is being operated, and subsequently spraying successive coatings of said slurry over said first coating to build up a patch of the desired thickness.

7. A method of hot patching a flame-exposed surface of a high temperature continuously operating metallurgical furnace comprising spraying a slurry of powdered refractory material and water in a thin coating on said surface while said surface is at about a normal temperature for the operation of said furnace, and subsequently spraying successive coatings of said slurry over said first coating to build up a patch of the desired thickness, said refractory material comprising 0.1 to 10% fire-clay and the balance principally silica.

8. A method of hot patching a flame-exposed surface of a high temperature continuously operating furnace comprising spraying a slurry of powdered refractory material and water in a thin coating on said surface while said surface is at about a normal temperature for the operation of said furnace, and subsequently spraying successive coatings of said slurry over said first coating to build up a patch of the desired thickness, said refractory material comprising silica with a small amount of fire-clay and having a particle size such that a major portion thereof will pass through a 200 mesh screen.

9. A method of hot patching a flame-exposed surface of a high temperature continuously operating furnace comprising spraying a slurry of powdered refractory material and water in a thin coating on said surface while said surface is at about a normal temperature for the operation of said furnace, and subsequently spraying successive coatings of said slurry over said first coating to build up a patch of the desired thickness, said refractory material comprising pulverized silica with a small amount of pulverized fire-clay and said slurry containing sufficient water to provide a specific gravity of about 1.5 to about 1.9.

10. A method of hot patching a flame-exposed surface of a high temperature continuously operating furnace comprising spraying a slurry of powdered refractory material and water in a thin coating on said surface while said surface is at about a normal temperature for the operation of said furnace, and subsequently spraying successive coatings of said slurry over said first coating to build up a patch of the desired thickness, said refractory material comprising a small amount up to about 10% fire-clay with the balance principally silica and having a particle size such that a major portion thereof will pass through a 200 mesh screen and a substantial proportion thereof will pass through a 300 mesh screen.

11. A method of hot patching an interior surface of a metallurgical furnace comprising pulverizing separately high silica sandstone and fire-clay to a fineness such that a major portion thereof will pass through a 200 mesh screen, heating and agitating said fire-clay with a small amount of water to provide a uniform suspension, incorporating said suspension with said sandstone and water in the proportions of about 97% sandstone and about 3% fire-clay on a dry basis to form a slurry having a specific gravity of about 1.6 to about 1.8, and pneumatically spraying successive thin coats of said slurry upon the surface to be patched while said surface is at a normal temperature for the operation of said furnace.

12. A method of hot patching a flame-exposed surface of a high temperature continuously operating furnace comprising spraying a slurry of powdered refractory material and water in a thin coating on said surface while said furnace is being operated, and subsequently spraying successive coatings of said slurry over said first coating to build up a patch of the desired thickness, said refractory material being of a particle size such that it will substantially all pass through a 100 mesh screen.

13. The method of hot patching a high temperature continuously operating furnace containing molten mineral materials comprising forming a uniform mixed slurry of powdered refractory materials, the chemical composition and water content of said slurry being proportioned to produce an initially adhesive patch adapted to become ceramically bonded to a flame exposed surface of said furnace at the highest normal operating temperature thereof, and pneumatically spraying successive thin coatings of said slurry on the under surface of the furnace roof while said surface is at a temperature approximating its temperature during normal operation of the furnace.

FREDERICK W. WINKLER.
FRANCIS X. MOONEY.
CHARLES R. KUZELL.
MELVIN T. MOUNTS.